United States Patent
Edwards et al.

(10) Patent No.: US 9,712,545 B2
(45) Date of Patent: Jul. 18, 2017

(54) DETECTION OF A MALICIOUS PERIPHERAL

(71) Applicant: McAfee, Inc., Santa Clara, CA (US)

(72) Inventors: Jonathan L. Edwards, Portland, OR (US); Cedric Cochin, Portland, OR (US); Aditya Kapoor, Portland, OR (US)

(73) Assignee: McAfee, Inc., Santa Clara, CA (US)

(*) Notice: Subject to any disclaimer, the term of this patent is extended or adjusted under 35 U.S.C. 154(b) by 7 days.

(21) Appl. No.: 14/582,009

(22) Filed: Dec. 23, 2014

(65) Prior Publication Data

US 2016/0182539 A1    Jun. 23, 2016

(51) Int. Cl.
| | |
|---|---|
| *G06F 11/00* | (2006.01) |
| *G06F 12/14* | (2006.01) |
| *G06F 12/16* | (2006.01) |
| *H04L 29/06* | (2006.01) |
| *H04L 12/24* | (2006.01) |

(52) U.S. Cl.
CPC .......... *H04L 63/1416* (2013.01); *H04L 41/12* (2013.01); *H04L 63/101* (2013.01)

(58) Field of Classification Search
CPC ............. H04L 63/1416; H04L 63/1425; H04L 63/1441; H04L 63/145; G06F 2221/034
USPC .......................................................... 726/23
See application file for complete search history.

(56) References Cited

U.S. PATENT DOCUMENTS

| | | | |
|---|---|---|---|
| 4,551,831 A | * | 11/1985 | Vaughn .................... H04L 12/52 370/366 |
| 5,987,610 A | | 11/1999 | Franczek et al. |
| 6,073,142 A | | 6/2000 | Geiger et al. |
| 6,460,050 B1 | | 10/2002 | Pace et al. |
| 7,506,155 B1 | | 3/2009 | Stewart et al. |
| 8,566,946 B1 | | 10/2013 | Aziz et al. |
| 2005/0021996 A1 | * | 1/2005 | Howard ................. G06F 21/445 726/26 |
| 2007/0261118 A1 | | 11/2007 | Lu |
| 2010/0064036 A1 | * | 3/2010 | Li .............................. G06F 8/60 709/222 |
| 2012/0036572 A1 | | 2/2012 | Yoo |
| 2012/0311207 A1 | | 12/2012 | Powers et al. |
| 2013/0227691 A1 | | 8/2013 | Aziz et al. |

OTHER PUBLICATIONS

International Search Report and Written Opinion in International Application No. PCT/US2015/062634, mailed on Apr. 22, 2016, 11 pages.

\* cited by examiner

*Primary Examiner* — Kambiz Zand
*Assistant Examiner* — Stephen Sanders
(74) *Attorney, Agent, or Firm* — Patent Capital Group (57) ABSTRACT

Particular embodiments described herein provide for an electronic device that can be configured to determine when a peripheral is connected to the electronic device, determine a peripheral identification for the peripheral, and monitor the data going to and from the peripheral. Based on the monitored data, a type for the peripheral can be determine. The peripheral identification can be compared with the determined type for the peripheral and if they do not match, then communication to and from the peripheral can be blocked.

24 Claims, 8 Drawing Sheets

DETECTION OF A MALICIOUS PERIPHERAL

TECHNICAL FIELD

This disclosure relates in general to the field of information security, and more particularly, to detection of a malicious peripheral.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
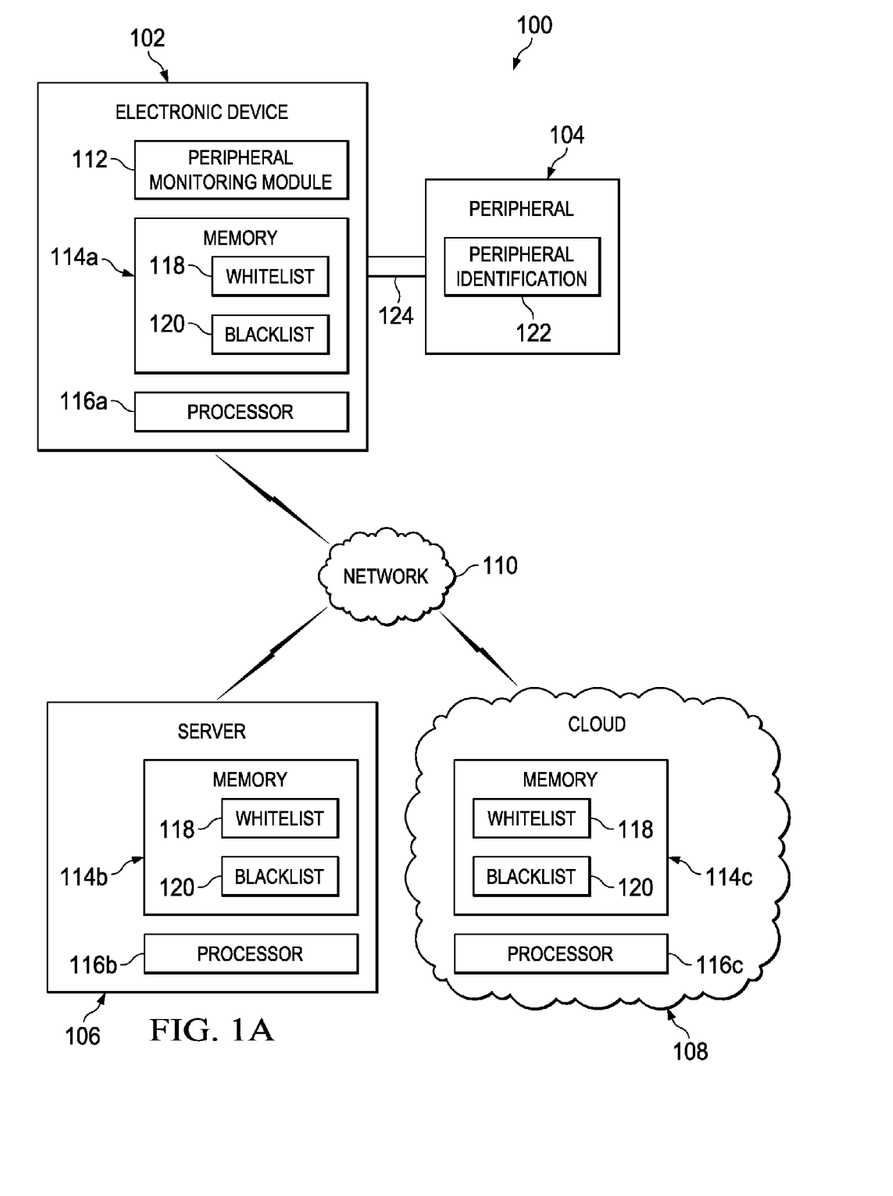
FIG. 1A is a simplified block diagram of a communication system detection of a malicious peripheral in accordance with an embodiment of the present disclosure.

FIG. 1A is a simplified block diagram of a communication system 100 for the detection of a malicious peripheral in accordance with an embodiment of the present disclosure. As illustrated in FIG. 1A, an embodiment of communication system 100 can include electronic device 102, a peripheral 104, a server 106, and a cloud 108. Electronic device 102 can include a peripheral monitoring module 112, memory 114a, and a processor 116a. In one example, memory 114a may include whitelist 118 and blacklist 120. Peripheral 104 can include a peripheral identification (ID) 122. Server 106 can include memory 114b and a processor 116b. Memory 114b can include whitelist 118 and blacklist 120. Cloud 108 can include memory 114c and a processor 116c. Memory 114c can include whitelist 118 and blacklist 120.

Electronic device 102, server 106, and cloud 108 may be in communication using network 110. Electronic device 102 can be in communication with peripheral 104 using an electrical connector 124. Electrical connector 124 can be configured to allow an electrical current and signals can be passed between electronic device 102 and peripheral 104 and provide a communication path between electronic device 102 and peripheral 104 (e.g., USB cable, FireWire, etc.)

Figure 1B:
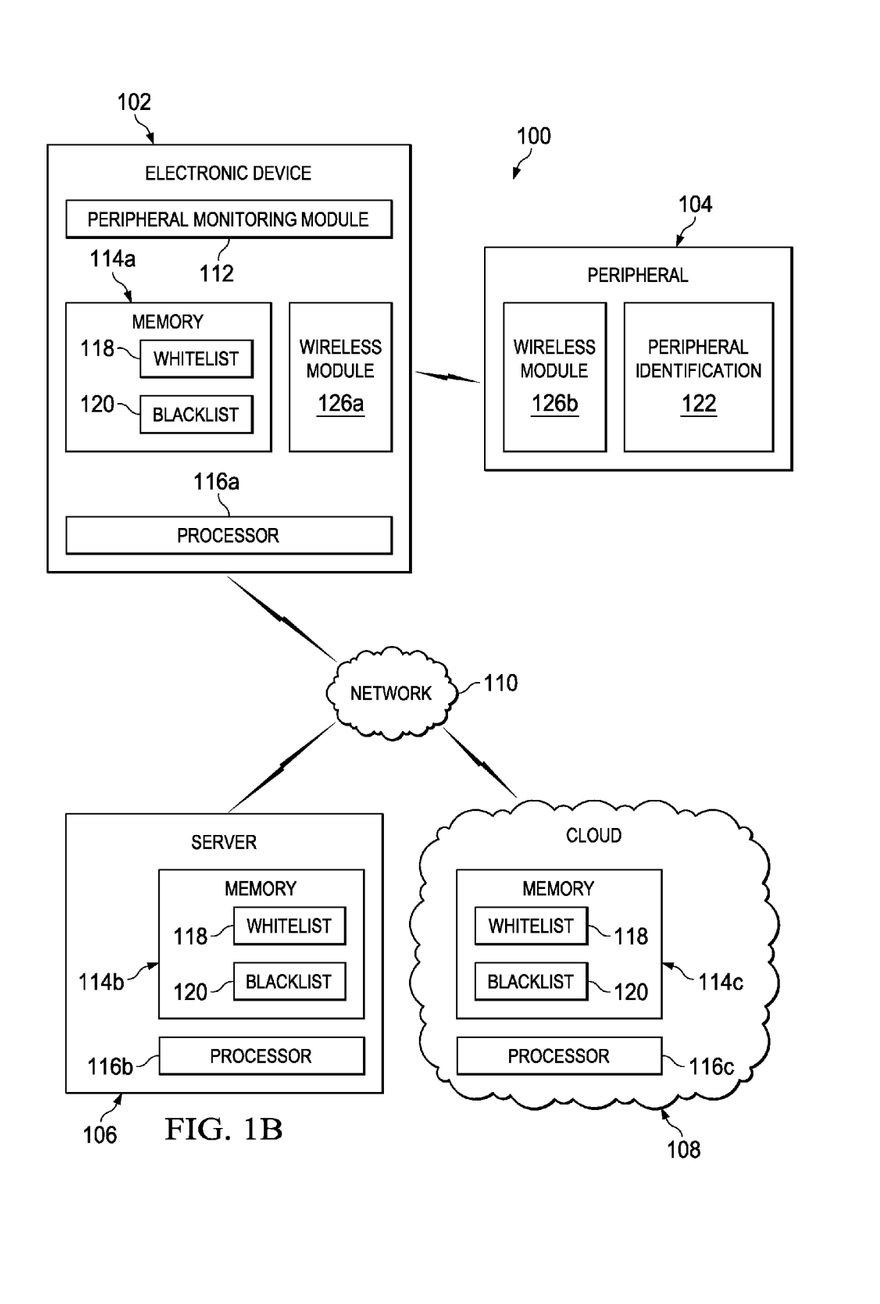
FIG. 1B is a simplified block diagram of a communication system detection of a malicious peripheral in accordance with an embodiment of the present disclosure.

FIG. 1B is a simplified block diagram of a communication system 100 for the detection of a malicious peripheral in accordance with an embodiment of the present disclosure. As illustrated in FIG. 1B, Electronic device 102 can be in communication with peripheral 104 using wireless modules 126a and 126b. Wireless modules 126a and 126b can be configured to provide a wireless communication path between electronic device 102 and peripheral 104 (e.g., WiFi, Bluetooth, etc.)

In an embodiment, peripheral monitoring module 112 can be configured to monitor the connection between electronic device 102 and peripheral 104 for malicious activity.
CLAIMS Elements of FIG. 1 may be coupled to one another through one or more interfaces employing any suitable connections (wired or wireless), which provide viable pathways for network (e.g., network 110) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Peripheral 104 can be a peripheral device and is generally defined as any auxiliary device such as a Universal Serial Bus (USB) flash drive, computer mouse, keyboard, speaker, microphone, etc. that connects to and works with an electrical device such as a computer in some way. Peripheral devices are extremely popular and a majority of computers are connected to at least one peripheral device or have been connected to a peripheral device at some point. Because of their popularity, some peripheral devices have been reconfigured to perform malicious actions such as inserting malware onto a connected device or stealing confidential information. For example, a USB storage device (e.g., a thumb drive) may look like a storage device but the USB storage device may have been maliciously reprogrammed to behave like a storage device and a keyboard. When the USB storage device is connected to a computer, the USB storage device may perform some malicious action such as where the keyboard part of the USB storage device sends key strokes to the computer to instruct the computer to execute a malicious executable on the storage portion of the USB storage device. A user would not know that the USB storage device was behaving like a keyboard and thus would be unaware of the malicious activity. Hence, significant administrative challenges remain for protecting computers and computer networks from malicious and inadvertent exploitation by malicious peripheral devices.

A communication system, as outlined in FIGS. 1A and 1B can resolve these issues (and others). Communication system 100 may be configured to include a peripheral monitoring module (e.g., peripheral monitoring module 112) to determine if a peripheral connected to an electronic device is malicious or safe. For example, a peripheral may be allowed if the peripheral ID (e.g., peripheral ID 122) is included in a whitelist (e.g., whitelist 118) or blocked or denied if the peripheral ID (e.g., peripheral ID 122) is included in a blacklist (e.g., blacklist 120). However, if the peripheral has been maliciously tampered with or altered, the peripheral ID may have also been maliciously altered to claim that the peripheral is a very common device (e.g., a Microsoft® keyboard or a Kingston® storage device) when in reality, the peripheral may be malicious.

The peripheral monitoring module (e.g., peripheral monitoring module 112) can be configured to monitor the traffic to and from the peripheral and determine a type of device for the peripheral. The peripheral monitoring module can apply a set of rules to new peripherals to decide whether to allow the peripheral or to block the peripheral. For example, the peripheral monitoring module may prevent the mounting of a peripheral if the traffic to and from the peripheral suggests that the peripheral is a keyboard and a keyboard is already connected to the electronic device. Also, the peripheral monitoring module may prevent the mounting of a peripheral if the peripheral is both a storage device and an input device. In addition, the peripheral monitoring module may prevent the mounting of a peripheral if the peripheral has two or more functions and the two functions are unrelated (e.g., storage and input would be disallowed while video input and audio input would be allowed).

Turning to the infrastructure of FIG. 1, communication system 100 in accordance with an example embodiment is shown. Generally, communication system 100 can be implemented in any type or topology of networks. Network 110 represents a series of points or nodes of interconnected communication paths for receiving and transmitting packets of information that propagate through communication system 100. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, server 106, and cloud 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, server 106, and cloud 108 can include memory elements (e.g., memory 114a-114c) for storing information to be used in the operations outlined herein. Each of electronic device 102, server 106, and cloud 108 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102, server 106, and cloud 108 of communication system 100, may include software modules (e.g., peripheral monitoring module 112) to achieve, or to foster, operations as outlined herein. These modules may be suitably combined in any appropriate manner, which may be based on particular configuration and/or provisioning needs. In an embodiment, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102, server 106, and cloud 108 may include a processor (e.g. processor 116a-116c) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein hould be construed as being encompassed within the broad term 'processor.'

Electronic device 102 can be a network element and includes, for example, desktop computers, laptop computers, mobile devices, personal digital assistants, smartphones, tablets, or other similar devices. Peripheral 104 can be a peripheral that can be connected to electronic device 102 (e.g., thumb drive, keyboard, speakers, camera, etc.). Server 106 can be a network element such as a server or virtual server and can be associated with clients, customers, endpoints, or end users wishing to initiate a communication in communication system 100 via some network (e.g., network 110). The term 'server' is inclusive of devices used to serve the requests of clients and/or perform some computational task on behalf of clients within communication system 100. Although peripheral monitoring module 112 is represented in FIG. 1 as being located in electronic device 102, this is for illustrative purposes only. Peripheral monitoring module 112 could be combined or separated in any suitable configuration. Furthermore, peripheral monitoring module 112 could be integrated with or distributed in ar network accessible by electronic device 102. Cloud 108 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
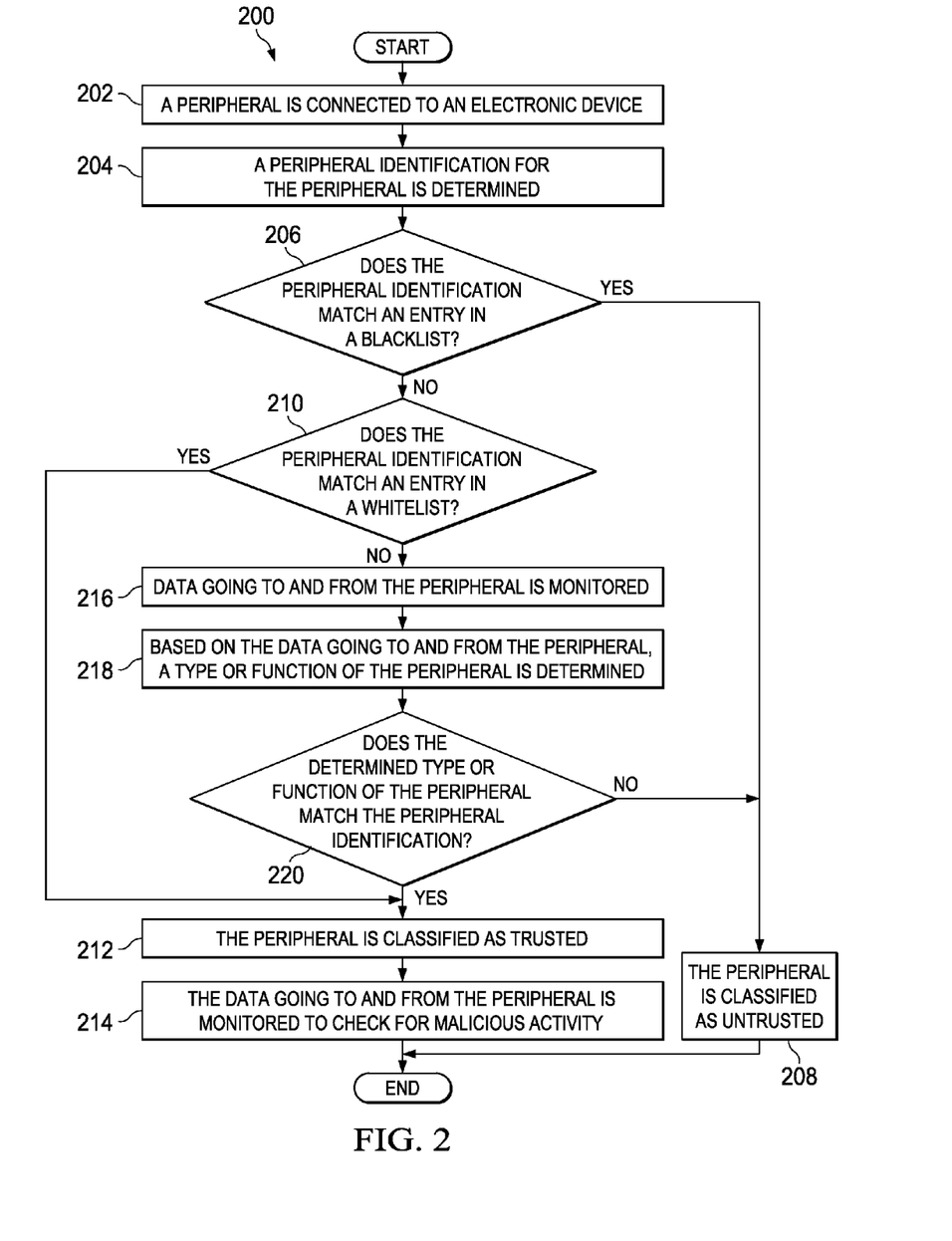
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with the detection of a malicious peripheral, in accordance with an embodiment. In an embodiment, one or more operations of flow 200 may be performed by peripheral monitoring module 112. At 202, a peripheral is connected to an electronic device. At 204, a peripheral ID for the peripheral is determined. The peripheral ID indicates to the electronic device the type or device of the peripheral (e.g., a keyboard, mouse, speaker, storage device, etc.). At 206, the system determines if the peripheral ID matches an entry in a blacklist. If the peripheral ID matches an entry in a blacklist, then the peripheral is classified as untrusted, as in 208. If the peripheral ID does not match an entry in a blacklist, then the system determines if the peripheral ID matches an entry in a whitelist, as in 210. If the peripheral ID matches an entry in a whitelist, then the peripheral is classified as trusted, as in 212. In an embodiment, the system (e.g., peripheral monitoring module 112) may not determine if peripheral ID 122 matches an entry in whitelist 118 because if peripheral 104 has been maliciously tampered with, peripheral ID 122 could also have been maliciously tampered with and changed to a peripheral ID that is known to be included in whitelist 118. At 214, the data going to and from the peripheral is monitored for malicious activity.

Going back to 210, if the peripheral ID does not match an entry in a whitelist (or if peripheral monitoring module 112 does not determine if peripheral ID 122 is included in whitelist 118), then data going to and from the peripheral is monitored, as in 216. At 218, based on the data going to and from the peripheral, a type or function of the peripheral is determined. At 220, the system determines if the determined type of function of the peripheral matches the peripheral ID. If the determined type of function of the peripheral does not match the peripheral ID, then the peripheral is classified as untrusted, as in 208. If the determined type of function of the peripheral matches the peripheral ID, then the peripheral is classified as trusted, as in 212. At 214, the data going to and from the peripheral is monitored to check for malicious activity. This could include repeatedly determining, based on the data going to and from the peripheral, the type or function of the peripheral and comparing the determined type or function to the peripheral ID.

Figure 3:
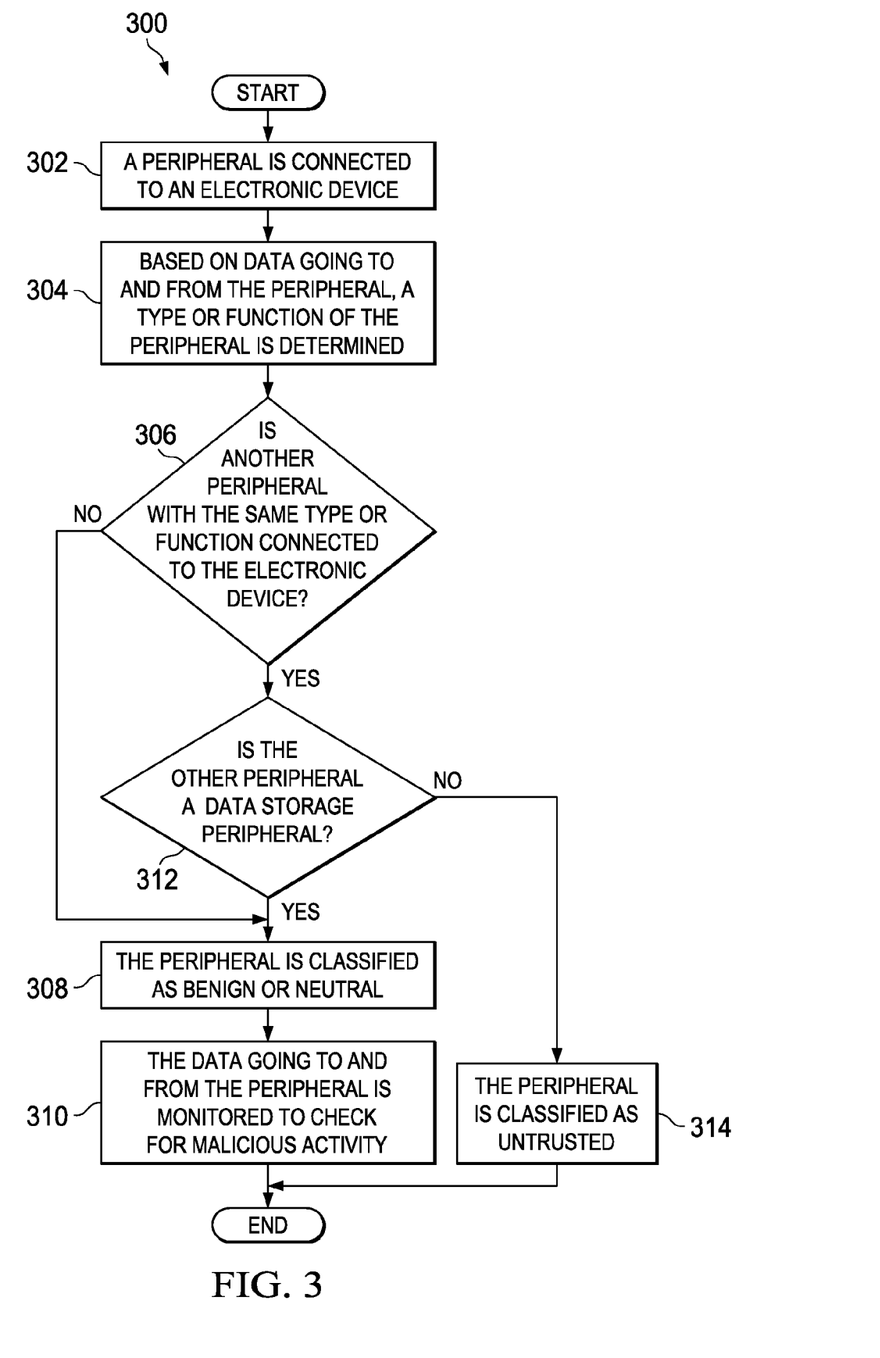
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the detection of a malicious peripheral, in accordance with an embodiment. In an embodiment, one or more operations of flow 300 may be performed by peripheral monitoring module 112. At 302, a peripheral is connected to an electronic device. At 304, based on data going to and from the peripheral, a type or function of the peripheral is determined. At 306, the system determines if another peripheral with the same type or function is connected to the electronic device. Going back to 306, if another peripheral with the same type or function is not connected to the electronic device, then the peripheral is classified as benign or neutral, as in 308. At 310, the data going to and from the peripheral is monitored for malicious activity. If another peripheral with the same type or function is connected to the electronic device, then the system determines if the other peripheral is a data storage peripheral, as in 312. If the other peripheral is a data storage peripheral, then the peripheral is classified as benign or neutral, as in 308. If the other peripheral is not a data storage peripheral, then the peripheral is classified as untrusted, as in 314. In an embodiment, if the other peripheral is not a data storage peripheral, then a signal or alert may be sent to the system or a user that two of the same devices are connected to the electronic device (e.g., two keyboards are connected to the electronic device). They system or user may take remedial action to correct the issue or may create an exception. In another embodiment, the system may check to see if the peripheral is the same type as another connected peripheral and if the type of peripheral is one where it is common to have two of the same types of peripherals connected (e.g., speakers, monitors, fan, etc.).

Figure 4:
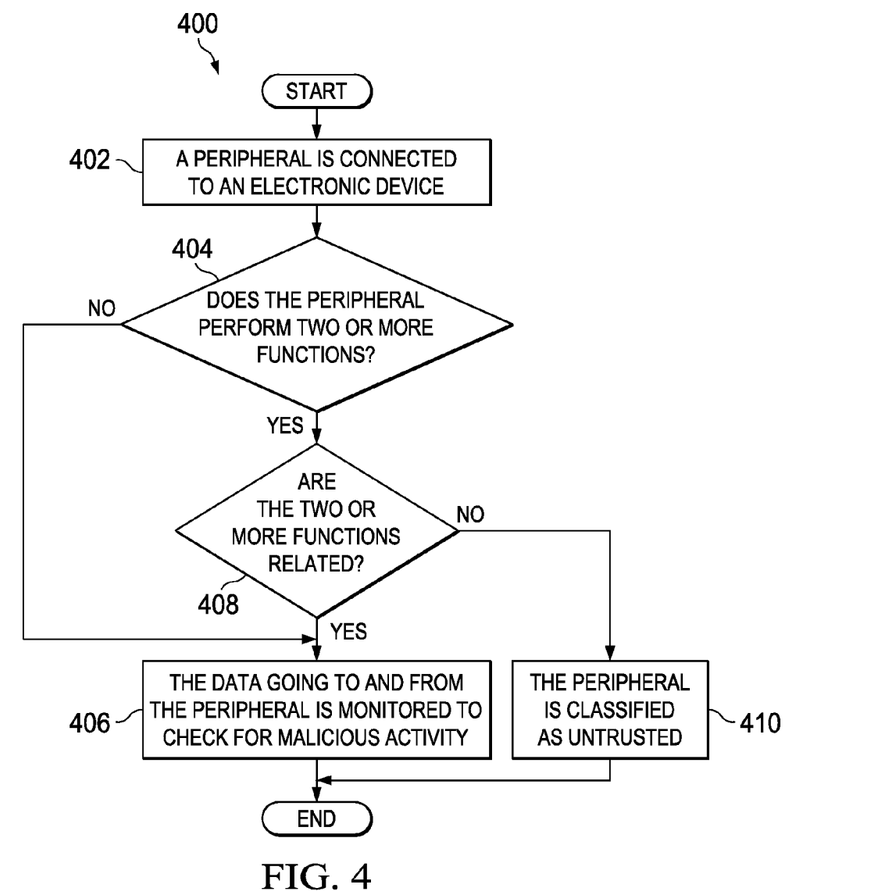
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the detection of a malicious peripheral, in accordance with an embodiment. In an embodiment, one or more operations of flow 400 may be performed by peripheral monitoring module 112. At 402, a peripheral is connected to an electronic device. At 404, the system determines if the peripheral performs two or more functions. If the device does not perform two or more functions, then the data going to and from the peripheral is monitored for malicious activity, as in 406. If the device does perform two or more functions, then the system determines if the two or more functions are related, as in 408. If the two or more function are related, then the data going to and from the peripheral is monitored for malicious activity, as in 406. If the two or more functions are not related, then the peripheral is classified as untrusted, as in 410.

Figure 5:
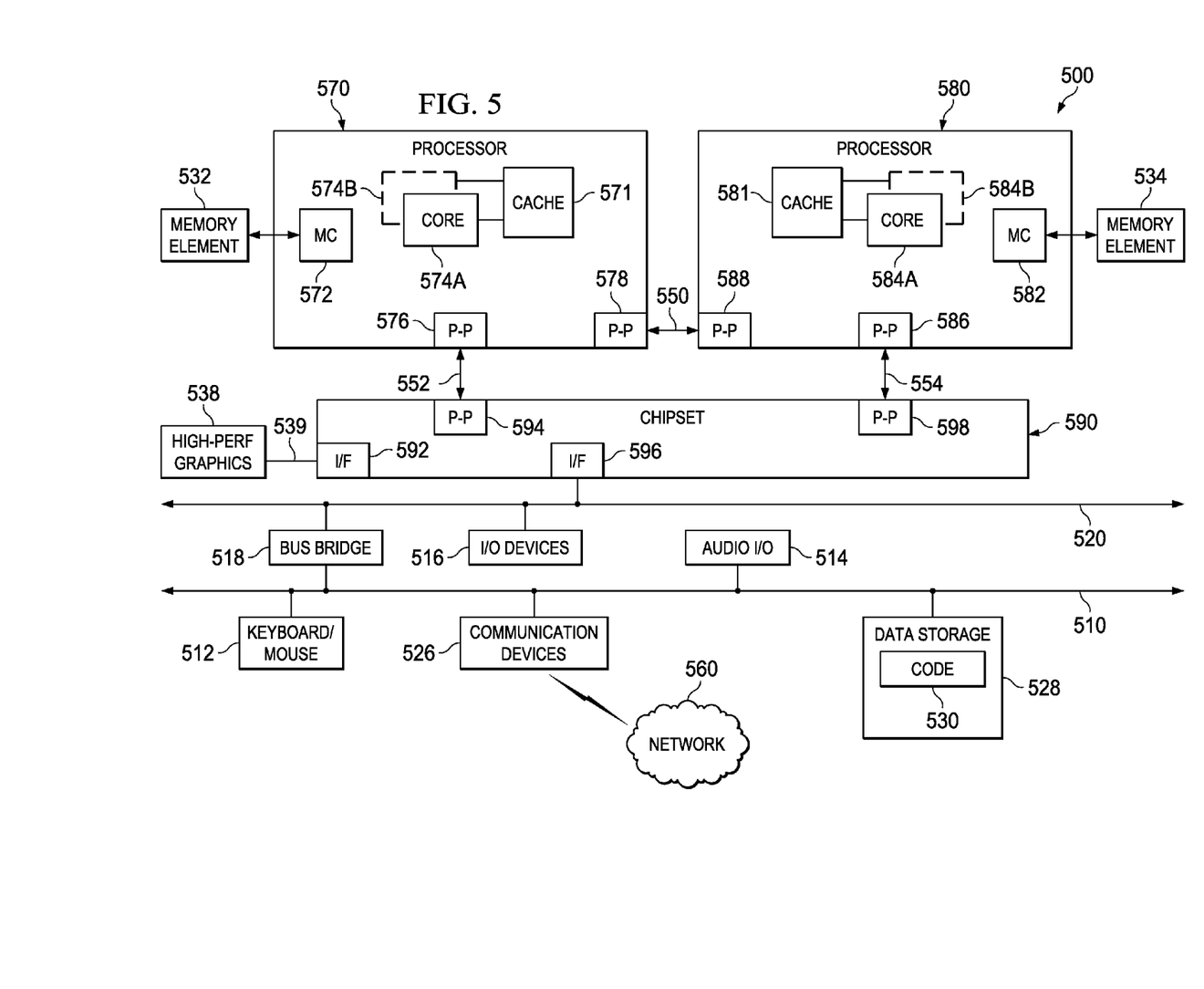
FIG. 5 is a block diagram illustrating an example computing system that is arranged in a point-to-point configuration in accordance with an embodiment.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor and may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
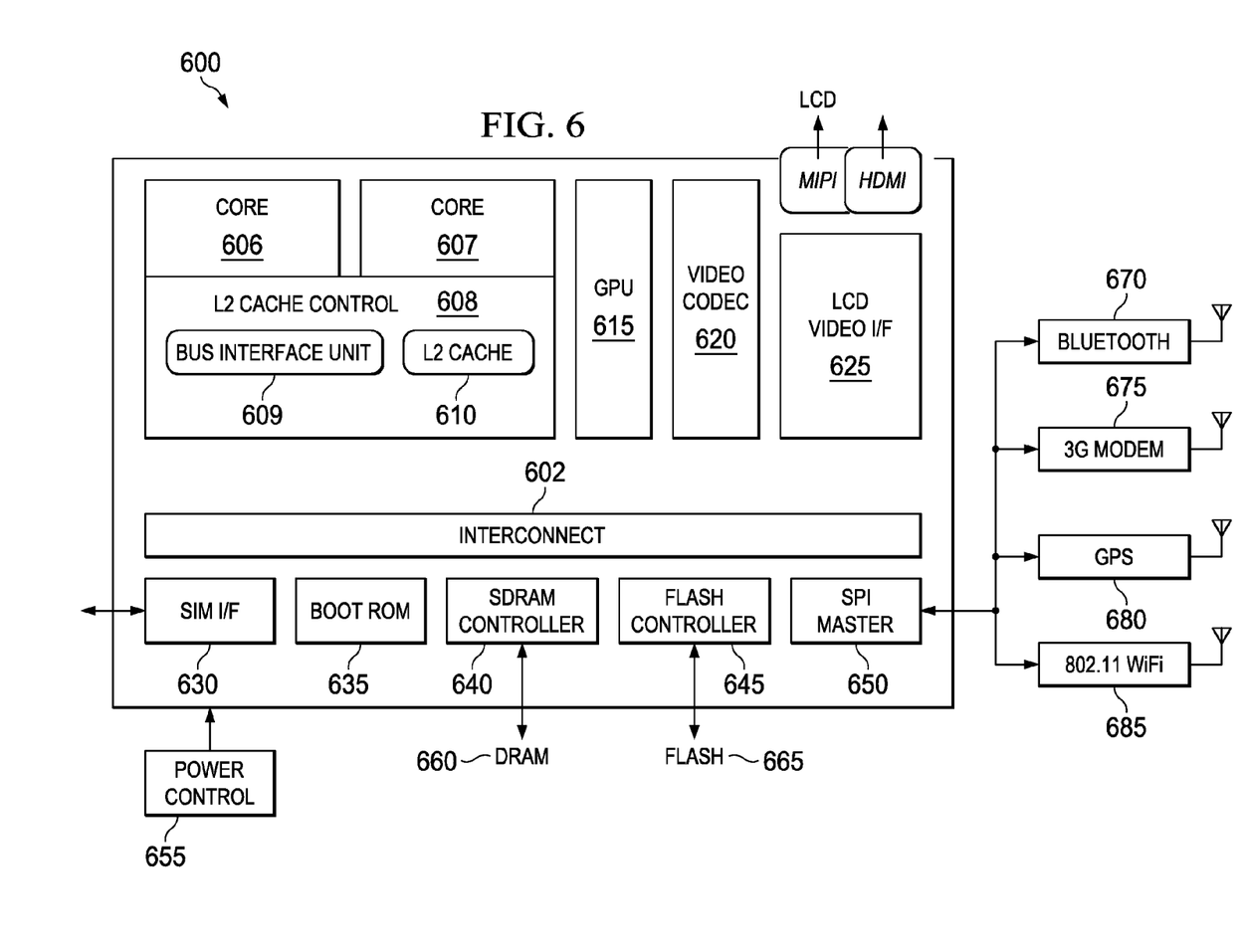
FIG. 6 is a simplified block diagram associated with an example ARM ecosystem system on chip (SOC) of the present disclosure.

Turning to FIG. 6, FIG. 6 is a simplified block diagram associated with an example ARM ecosystem SOC 600 of the present disclosure. At least one example implementation of the present disclosure can include the detection of a malicious peripheral features discussed herein and an ARM component. For example, the example of FIG. 6 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
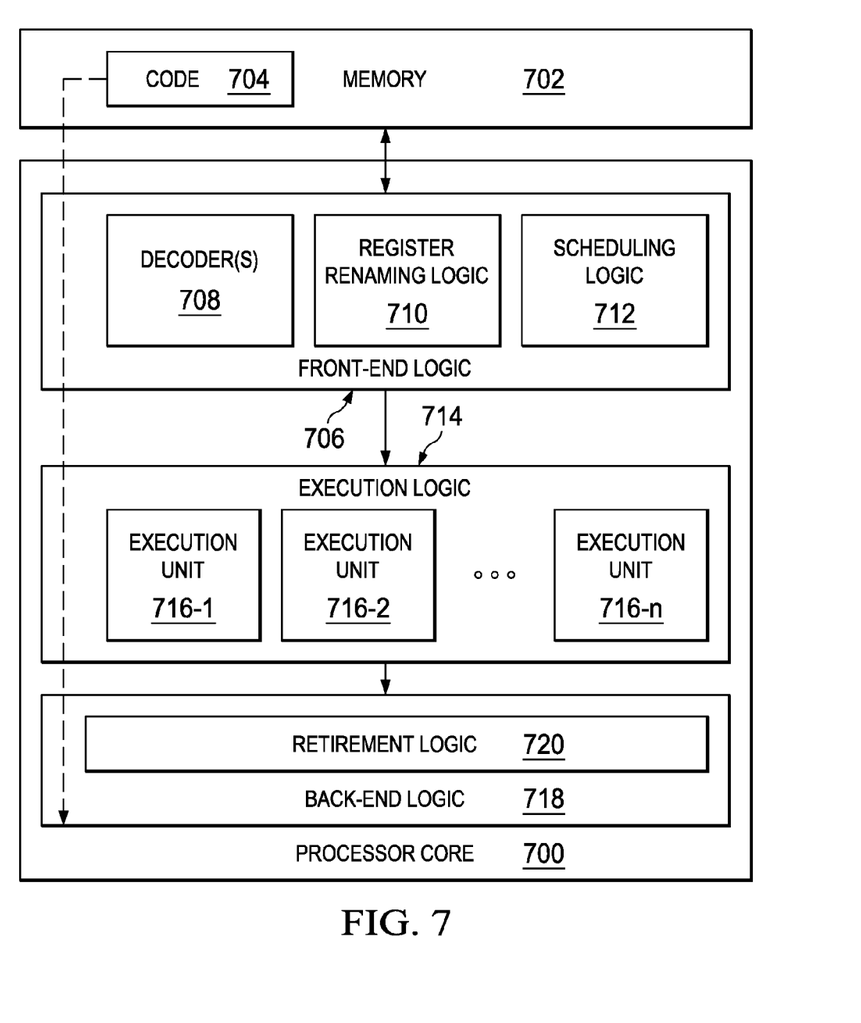
FIG. 7 is a block diagram illustrating an example processor core in accordance with an embodiment.

FIG. 7 illustrates a processor core 700 according to an embodiment. Processor core 700 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents one example embodiment of processors cores 574a, 574b, 574a, and 574b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to determine that a peripheral is connected to an electronic device, determine a peripheral identification for the peripheral, monitor data going to and from the peripheral, determine a type for the peripheral based on the monitored data, and compare the peripheral identification with the determined type for the peripheral.

In Example C2, the subject matter of Example C1 can optionally include where the one or more instructions that when executed by the at least one processor, further cause the processor to block communication to and from the peripheral if the peripheral identification does not match the determined type for the peripheral.

In Example C3, the subject matter of any one of Examples C1-C2 can optionally include where the one or more instructions that when executed by the at least one processor, further cause the processor to compare the peripheral identification to a blacklist and block communication to and from the peripheral if the peripheral identification matches an entry in the blacklist.

In Example C4, the subject matter of any one of Examples C1-C3 can optionally include where the one or more instructions that when executed by the at least one processor, further cause the processor to determine that a second peripheral is connected to the electronic device, determine a second type for the second peripheral, and block communication to and from the peripheral if the determined type for the peripheral matches the determined second type for the second peripheral.

In Example C5, the subject matter of any one of Examples C1-C4 can optionally include where the communication is allowed if the determined type for the peripheral is data storage and the determined second type for the second peripheral is also data storage.

In Example C6, the subject matter of any one of Example C1-C5 can optionally include where the one or more instructions that when executed by the at least one processor, further cause the processor to determine if the peripheral performs two or more functions and block communication to and from the peripheral if the two or more functions are not related.

In Example C7, the subject matter of any one of Examples C1-C6 can optionally include where the peripheral is connected to the electronic device using a hardwire connection.

In Example C8, the subject matter of any one of Examples C1-C7 can optionally include where the peripheral is connected to the electronic device using a wireless connection.

In Example A1, an electronic device can include a peripheral monitoring module, where the peripheral monitoring module is configured to determine that a peripheral is connected to an electronic device, determine a peripheral identification for the peripheral, monitor data going to and from the peripheral, determine a type for the peripheral based on the monitored data, and compare the peripheral identification with the determined type for the peripheral.

In Example, A2, the subject matter of Example A1 can optionally include where the peripheral monitoring module is further configured to block communication to and from the peripheral if the peripheral identification does not match the determined type for the peripheral.

In Example A3, the subject matter of any one of Examples A1-A2 can optionally include where the peripheral monitoring module is further configured to compare the peripheral identification to a blacklist and block communication to and from the peripheral if the peripheral identification matches an entry in the blacklist.

In Example A4, the subject matter of any one of Examples A1-A3 can optionally include where the peripheral monitoring module is further configured to determine that a second peripheral is connected to the electronic device, determine a second type for the second peripheral, and block communication to and from the peripheral if the determined type for the peripheral matches the determined second type for the second peripheral.

In Example A5, the subject matter of any one of Examples A1-A4 can optionally include where the peripheral monitoring module is further configured to determine if the peripheral performs two or more functions and block communication to and from the peripheral if the two or more functions are not related.

In Example A6, the subject matter of any one of Examples A1-A5 can optionally include where each stack frame is analyzed as it unwinds.

In Example A7, the subject matter of any one of Examples A1-A6 can optionally include where the peripheral is connected to the electronic device using a hardwire connection.

In Example A8, the subject matter of any one of Examples A1-A7 can optionally include where the peripheral is connected to the electronic device using a wireless connection.

Example M1 is a method including determining that a peripheral is connected to an electronic device, determining a peripheral identification for the peripheral, monitoring data going to and from the peripheral, determining a type for the peripheral based on the monitored data, and comparing the peripheral identification with the determined type for the peripheral.

In Example M2, the subject matter of Example M1 can optionally include blocking communication to and from the peripheral if the peripheral identification does not match the determined type for the peripheral.

In Example M3, the subject matter of any one of the Examples M1-M2 can optionally include comparing the peripheral identification to a blacklist and blocking communication to and from the peripheral if the peripheral identification matches an entry in the blacklist.

In Example M4, the subject matter of any one of the Examples M1-M3 can optionally include determining that a second peripheral is connected to the electronic device, determining a second type for the second peripheral, and blocking communication to and from the peripheral if the determined type for the peripheral matches the determined second type for the second peripheral.

In Example M5, the subject matter of any one of the Examples M1-M4 can optionally include where the communication is allowed if the determined type for the peripheral is data storage and the determined second type for the second peripheral is also data storage.

In Example M6, the subject matter of any one of the Examples M1-M5 can optionally include determining if the peripheral performs two or more functions and blocking communication to and from the peripheral if the two or more functions are not related.

Example S1 is a system for detection of a malicious peripheral, the system including a peripheral monitoring module configured for determining that a peripheral is connected to an electronic device, determining a peripheral identification for the peripheral, monitoring data going to and from the peripheral, determine a type for the peripheral based on the monitored data, and comparing the peripheral identification with the determined type for the peripheral.

In Example S2, the subject matter of Example S1 can optionally include where the peripheral monitoring module is further configured for blocking communication to and from the peripheral if the peripheral identification does not match the determined type for the peripheral.

In Example S3, the subject matter of any one of the Examples S1-S2 can optionally include where the peripheral monitoring module is further configured for determining if the peripheral performs two or more functions and blocking communication to and from the peripheral if the two or more functions are not related.

Example X1 is a machine-readable storage medium including machine-readable instructions to implement a method or realize an apparatus as in any one of the Examples A1-A8, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the at least one processor to:
    determine that a peripheral is connected to an electronic device;
    determine a peripheral identification for the peripheral;
    determine whether the peripheral identification matches an entry in a blacklist;
    monitor data from the peripheral;
    determine a type for the peripheral based on the monitored data;
    determine whether the peripheral identification matches the determined type for the peripheral; and
    block communication to and from the peripheral based on a determination that the peripheral identification does not match the determined type for the peripheral.

2. The at least one computer-readable medium of claim 1, further comprising one or more instructions that when executed by the at least one processor, further cause the processor to:
    block communication to and from the peripheral based on a determination that the peripheral identification matches an entry in the blacklist.

3. The at least one computer-readable medium of claim 1, further comprising one or more instructions that when executed by the at least one processor, further cause the processor to:
    determine that a second peripheral is connected to the electronic device;
    determine a second type for the second peripheral; and
    block communication to and from the peripheral based on a determination that the determined type for the peripheral matches the determined second type for the second peripheral.

4. The at least one computer-readable medium of claim 3, further comprising one or more instructions that when executed by the at least one processor, further cause the processor to:
    allow the communication based on a determination that the determined type for the peripheral is data storage and the determined second type for the second peripheral is also data storage.

5. The at least one computer-readable medium of claim 1, further comprising one or more instructions that when executed by the at least one processor, further cause the processor to:
    determine whether the peripheral performs two or more functions;
    determine the type of the two or more functions; and
    block communication to and from the peripheral based on a determination that the two or more functions are not related.

6. The at least one computer-readable medium of claim 1, wherein the peripheral is connected to the electronic device using a hardwire connection.

7. The at least one computer-readable medium of claim 1, wherein the peripheral is connected to the electronic device using a wireless connection.

8. An apparatus comprising:
    a hardware processor
    configured to:
        determine that a peripheral is connected to an electronic device;
        determine a peripheral identification for the peripheral;
        determine whether the peripheral identification matches an entry in a blacklist;
        monitor data from the peripheral;
        determine a type for the peripheral based on the monitored data;
        determine whether the peripheral identification matches the determined type for the peripheral; and
        block communication to and from the peripheral based on a determination that the peripheral identification does not match the determined type for the peripheral.

9. The apparatus of claim 8, wherein the hardware processor is further configured to:
    block communication to and from the peripheral based on a determination that the peripheral identification matches an entry in the blacklist.

10. The apparatus of claim 8, wherein the hardware processor is further configured to:
    determine that a second peripheral is connected to the electronic device;
    determine a second type for the second peripheral; and
    block communication to and from the peripheral based on a determination that the determined type for the peripheral matches the determined second type for the second peripheral.

11. The apparatus of claim 10, wherein the hardware processor is further configured to:
    allow the communication based on a determination that the determined type for the peripheral is data storage and the determined second type for the second peripheral is also data storage.

12. The apparatus of claim 8, wherein the hardware processor is further configured to:
    determine whether the peripheral performs two or more functions;
    determine the type of the two or more functions; and
    block communication to and from the peripheral based on a determination that the two or more functions are not related.

13. The apparatus of claim 8, wherein the peripheral is connected to the electronic device using a hardwire connection.

14. The apparatus of claim 8, wherein the peripheral is connected to the electronic device using a wireless connection.

15. A method comprising:
    determining that a peripheral is connected to an electronic device;
    determining a peripheral identification for the peripheral;
    determining whether the peripheral identification matches an entry in a blacklist;
    monitoring data from the peripheral;
    determining a type for the peripheral based on the monitored data;
    determining whether the peripheral identification matches the determined type for the peripheral; and blocking communication to and from the peripheral based on a determination that the peripheral identification does not match the determined type for the peripheral.

16. The method of claim 15, further comprising:
blocking communication to and from the peripheral based on a determination that the peripheral identification matches an entry in the blacklist.

17. The method of claim 15, further comprising:
determining that a second peripheral is connected to the electronic device;
determining a second type for the second peripheral; and
blocking communication to and from the peripheral based on a determination that the determined type for the peripheral matches the determined second type for the second peripheral.

18. The method of claim 17, further comprising:
allowing the communication based on a determination that the determined type for the peripheral is data storage and the determined second type for the second peripheral is also data storage.

19. The method of claim 15, further comprising:
determining whether the peripheral performs two or more functions;
determining the type of the two or more functions; and
blocking communication to and from the peripheral based on a determination that the two or more functions are not related.

20. A system for detection of a malicious peripheral, the system comprising:
a memory; and
a hardware processor
configured for:
  determining that a peripheral is connected to an electronic device;
  determining a peripheral identification for the peripheral;
  determining whether the peripheral identification matches an entry in a blacklist;
  monitoring data from the peripheral;
  determining a type for the peripheral based on the monitored data;
  determining whether the peripheral identification matches the determined type for the peripheral; and
  blocking communication to and from the peripheral based on a determination that the peripheral identification does not match the determined type for the peripheral.

21. The system of claim 20, wherein the hardware processor is further configured for:
determining whether the peripheral performs two or more functions;
determining the type of the two or more functions; and
blocking communication to and from the peripheral based on a determination that the two or more functions are not related.

22. The system of claim 20, wherein the hardware processor is further configured for:
blocking communication to and from the peripheral based on a determination that the peripheral identification matches an entry in the blacklist.

23. The system of claim 20, wherein the hardware processor is further configured for:
determining that a second peripheral is connected to the electronic device;
determining a second type for the second peripheral; and
blocking communication to and from the peripheral based on a determination that the determined type for the peripheral matches the determined second type for the second peripheral.

24. The system of claim 23, wherein the hardware processor is further configured for:
allowing the communication based on a determination that the determined type for the peripheral is data storage and the determined second type for the second peripheral is also data storage.

* * * * *